United States Patent
Seidl et al.

(10) Patent No.: US 7,171,540 B1
(45) Date of Patent: Jan. 30, 2007

(54) OBJECT-ADDRESSED MEMORY HIERARCHY THAT FACILITATES ACCESSING OBJECTS STORED OUTSIDE OF MAIN MEMORY

(75) Inventors: Matthew L. Seidl, Longmont, CO (US); Gregory M. Wright, Mountain View, CA (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 361 days.

(21) Appl. No.: 10/698,728

(22) Filed: Oct. 31, 2003

(51) Int. Cl.
*G03F 12/10* (2006.01)

(52) U.S. Cl. .................. 711/206; 711/122; 711/144; 711/203; 711/3; 711/148; 711/221; 711/118; 710/306; 710/20; 710/305; 707/103; 707/10; 707/3

(58) Field of Classification Search ............ None
See application file for complete search history.

(56) References Cited

U.S. PATENT DOCUMENTS 5,887,275 A * 3/1999 Nguyen et al. ............ 711/206
6,128,623 A * 10/2000 Mattis et al. ............ 707/103 R
6,427,187 B2 * 7/2002 Malcolm ................ 711/119

\* cited by examiner

*Primary Examiner*—Reginald Bragdon
*Assistant Examiner*—Patrick M Moore
(74) *Attorney, Agent, or Firm*—Park, Vaughan & Fleming, LLP

(57) ABSTRACT

One embodiment of the present invention provides an object-addressed memory hierarchy that is able to access objects stored outside of main memory. During operation, the system receives a request to access an object, wherein the request includes an object identifier for the object that is used to reference the object within the object-addressed memory hierarchy. Next, the system uses the object identifier to retrieve an object table entry associated with the object. The system then examines a valid bit within the object table entry. If the valid bit indicates the object is located in main memory, the system uses a physical address in the object table entry to access the object in main memory. On the other hand, if the valid bit indicates that the object is not located in main memory, the system relocates the object into memory from a location outside of memory, and then accesses the object in main memory.

19 Claims, 3 Drawing Sheets

OBJECT-ADDRESSED MEMORY HIERARCHY THAT FACILITATES ACCESSING OBJECTS STORED OUTSIDE OF MAIN MEMORY

BACKGROUND

1. Field of the Invention

The present invention relates to the design of computer systems that support efficient references to objects defined within an object-oriented programming system. More specifically, the present invention relates to a method and an apparatus that provides an object-addressed memory hierarchy that is able to access objects stored outside of main memory.

2. Related Art

As object-oriented programming languages become more widely used, computer systems are being designed to manipulate objects more efficiently. When a computer system manipulates an object, it typically manipulates ancillary data structures associated with the object. For example, the object can be associated with a corresponding object table entry that contains metadata for the object, such as the object's physical address (if the object has one). In this example, to access the object it may be necessary to first access the corresponding object table entry to determine the physical address of the object.

In order to speed up this translation process, some proposed systems provide hardware support to translate between a location-independent object identifier (OID) and a corresponding location in physical memory (main memory) where the object is stored.

Such systems generally bypass the translation mechanisms of the virtual memory system. This means they must assume that objects will always fit into the physical memory of an executing computer system. Unfortunately, this assumption can greatly limit the size of applications that can run, especially in computer systems that have limited physical memory.

Hence, in order to overcome this limitation, what is needed is a method and an apparatus that allows an object-addressed memory hierarchy to manipulate objects that are located outside of physical memory.

SUMMARY

One embodiment of the present invention provides an object-addressed memory hierarchy that is able to access objects stored outside of main memory. During operation, the system receives a request to access an object, wherein the request includes an object identifier for the object that is used to reference the object within the object-addressed memory hierarchy. Next, the system uses the object identifier to retrieve an object table entry associated with the object. The system then examines a valid bit within the object table entry. If the valid bit indicates the object is located in main memory, the system uses a physical address in the object table entry to access the object in main memory. On the other hand, if the valid bit indicates that the object is not located in main memory, the system relocates the object into memory from a location outside of memory, and then accesses the object in main memory.

In a variation on this embodiment, the request to access the object is received at a translator that translates between object identifiers (used to reference objects in an object cache) and physical addresses (used to address objects in main memory).

In a further variation, prior to receiving the request at the translator, the request is initially directed to the object cache. If the request causes a hit in the object cache, the object is accessed in the object cache and the request is not sent to the translator. On the other hand, if the request causes a miss in the object cache, the request is sent to the translator.

In a variation on this embodiment, relocating the object into main memory involves using location information from the object table entry to determine the location of the object outside of main memory. This location information can include, a secondary storage address for the object, a network address for the object, a uniform (or universal) resource locator (URL) for the object, another (possibly different) object identifier associated with the object, and a physical address for a compressed block of objects containing the object.

In a further variation, the location information is overloaded into a physical address field in the object table entry.

In a variation on this embodiment, relocating the object into main memory involves causing an object fault handler to execute in a central processing unit (CPU) to relocate the object into main memory.

In a variation on this embodiment, relocating the object into main memory involves overlapping retrieval of multiple objects into main memory from locations outside of main memory.

In a variation on this embodiment, after relocating the object into main memory, the system updates the valid bit to specify that the object is located in main memory. The system also updates the physical address in the object table entry to specify the location of the object in main memory.

In a variation on this embodiment, the object is defined within an object-oriented programming system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
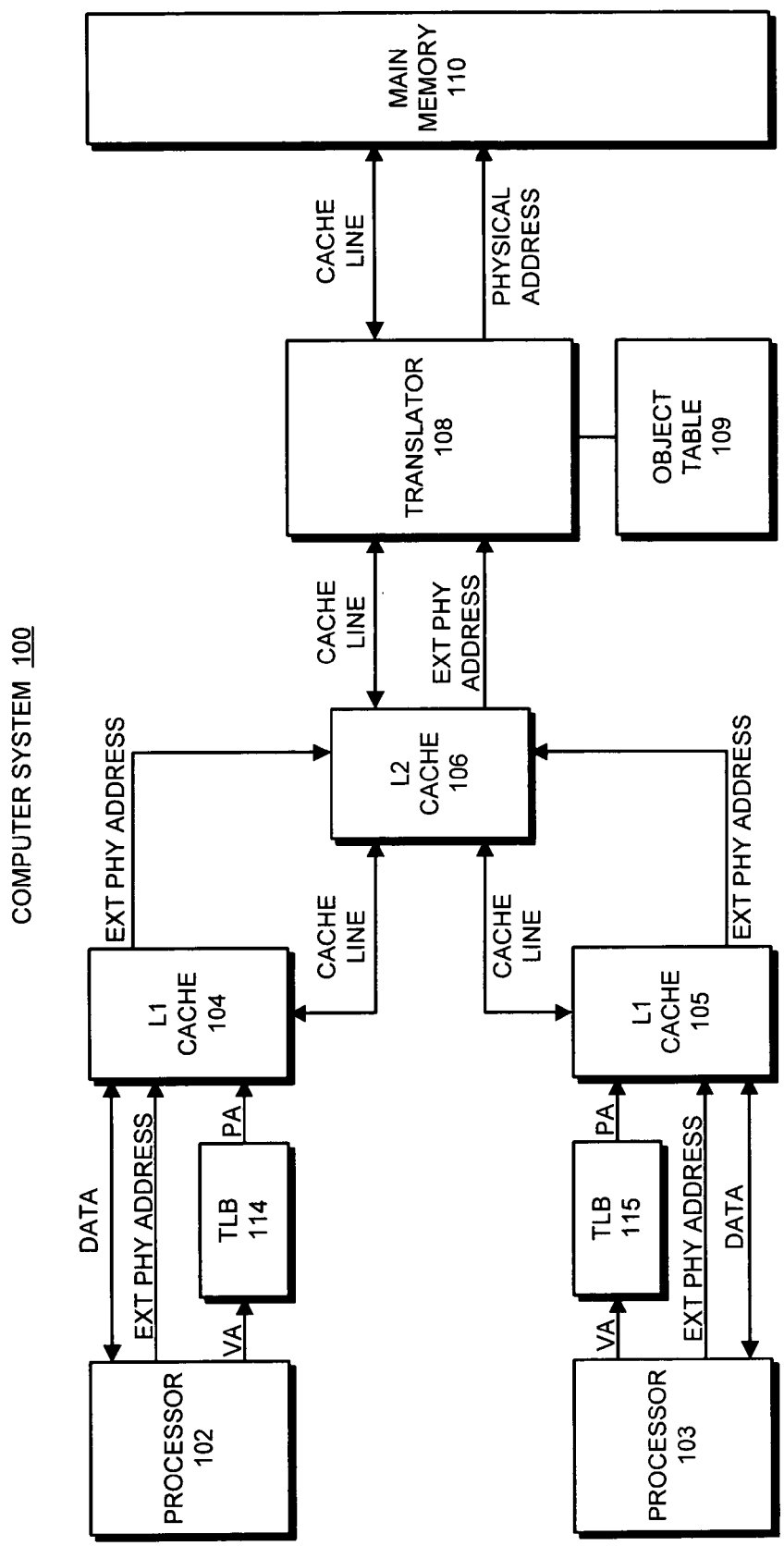
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103. Processors 102 and 103 access code and data from L1 caches 104 and 105, respectively. Note that L1 caches 104 and 105 can include unified instruction/data caches, or alternatively, separate instruction caches and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object ID (OID) and offset and combines them to create an object address. This object address is embedded into an unused portion of the physical address space to produce an encoded address. Note that the higher order bits of this encoded address are typically different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is relocated into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table 109 to translate the encoded address into a corresponding physical address. Each entry in object table 109 associates a given object ID with a corresponding physical address in main memory where the object resides.

When a cache miss for an object occurs in L2 cache 106, translator 108 intercepts the encoded address and extracts the object ID. Next, translator 108 uses the object ID to index into the object table 109 for a corresponding physical address. Once the physical address is found, translator 108 converts the load request for the object into a load request for a physical address in main memory 110.

The system then attempts to use the physical address and the offset to locate a specific cache line (or cache lines) in main memory 110. If the cache line is located in main memory 110, fetching circuitry within translator 108 issues a load request to main memory 110. This fetching circuitry subsequently receives the cache line corresponding to the physical address. The fetching circuitry then forwards the cache line to L2 cache 106. On the other hand, if the cache line is not located in main memory, a fault handler (or other mechanism) relocates the object into main memory from a location outside of main memory before the object is accessed in main memory. This process is described in more detail below with reference to FIGS. 2–3.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two memory read operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate a store operation to store the evicted cache line in main memory 110. Note that during the process of evicting an object line, it may be necessary to perform read-modify-write operations on two physical cache lines.

Note that processors 102 and 103 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two levels of cache, the present invention can generally be used with any single-level or multi-level caching structure. Furthermore, although computer system 100 includes two processors, the present invention can generally be used with any number of processors.

Objects Table Entry

Figure 2:
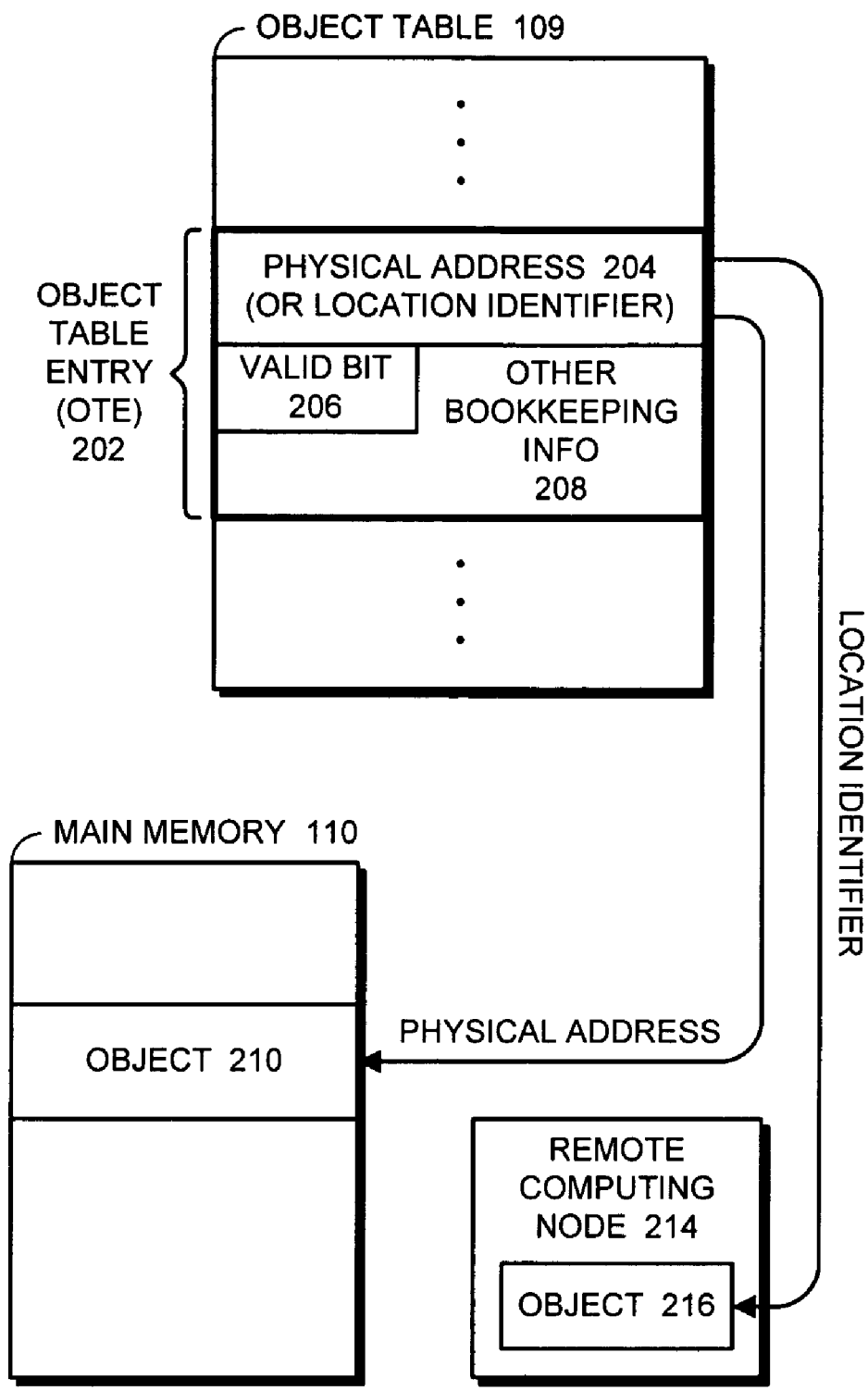
FIG. 2 illustrates an object table entry in accordance with an embodiment of the present invention.

FIG. 2 illustrates an object table entry 202 within object table 109 in accordance with an embodiment of the present invention. As is illustrated in FIG. 2, object table entry (OTE) 202 includes a number of items, such as a physical address 204, which specifies a location in main memory 110 for the corresponding object.

In one embodiment of the present invention, if the object is not presently stored in main memory 110, the physical address field contains a location identifier for the object (instead of a physical address in main memory 110). This location identifier can include any type of information that can be used to determine a location of the object outside of main memory. For example, the location identifier can include, a secondary storage address for the object, a network address for the object, a uniform (or universal) resource locator (URL) for the object, another (possibly different) object identifier associated with the object, or a physical address for a compressed block of objects containing the object.

OTE 202 can additionally include a valid bit 206, which indicates whether or not a valid copy of the corresponding object is contained within main memory 110. If valid bit 206 is set, OTE 202 contains a physical address 204, which can be used to access the corresponding object 210 in main memory 110. On the other hand, if valid bit 206 is not set, OTE 202 contains a location identifier 204, which can be used to retrieve the object so that the object can be loaded into main memory 110. For example, as is illustrated in FIG. 2, the location identifier 204 may identify a remote computing node 214 that contains a copy of the object 216.

OTE 202 also contains other bookkeeping information 208, such as the size of the object, which can be used while manipulating the object.

Process of Accessing an Object

Figure 3:
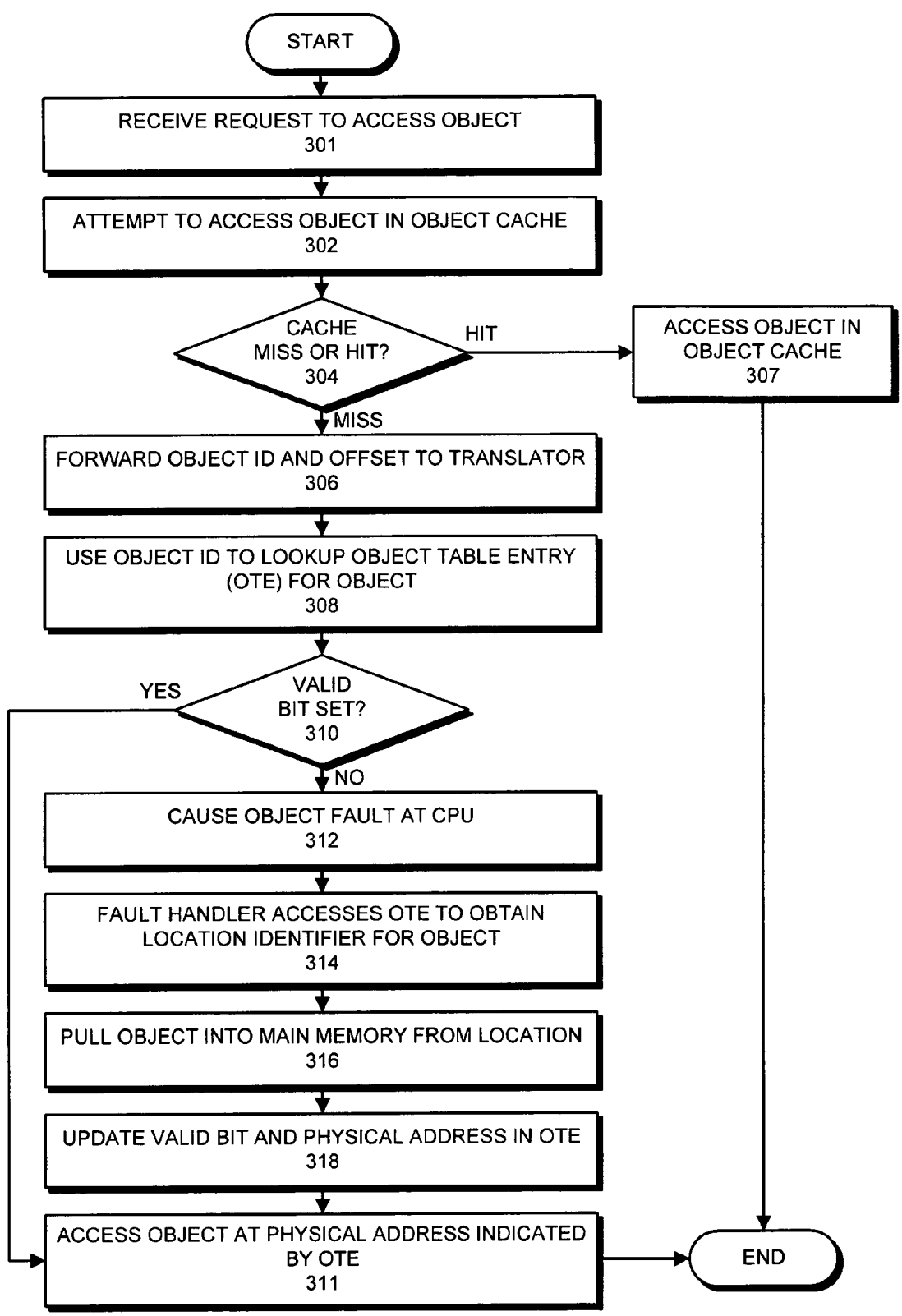
FIG. 3 presents a flow chart illustrating the process of using an object identifier to access an object in an object-addressed memory hierarchy in accordance with an embodiment of the present invention.

FIG. 3 presents a flow chart illustrating the process of accessing an object in accordance with an embodiment of the present invention. The system initially receives a request to access the object, wherein the request includes an object identifier (OID) that is used to reference the object in the object-addressed memory hierarchy (step 301). Next, the system uses the object identifier in an attempt to access the corresponding object in the object cache (step 302). This attempt either results in a cache hit or a cache miss (step 304).

In the case of a cache hit, the system accesses a copy of the object in the object cache (step 307). At this point, the request is satisfied.

Otherwise, in the case of a cache miss, the system forwards the object identifier and the corresponding object offset to translator 108 (see FIG. 1) (step 306). Translator 108 uses the object identifier to lookup OTE 202 in object table 109 (step 308).

The system then determines if valid bit 206 in OTE 202 is set (step 310). If so, the system uses the physical address 204 (and the object offset) to access the object in main memory 110 (step 311). At this point, the request is satisfied.

Otherwise, if the valid bit is not set, the system causes the processor that requested the access (for example processor 102) to take an object fault (step 312). During this object fault, the fault handler accesses OTE 202 to obtain a location identifier for the object (step 314). Next, the system relocates the object into main memory 110 from the identified location (step 316). Note that while relocating the object into main memory, the system can potentially retrieve related objects. These related objects may be situated near the identified location or may be relocated into main memory from other locations.

The system then updates the valid bit 206 to indicate that a valid copy of the object is contained in main memory 110. The system also updates the physical address 204 in OTE 202 with the physical address of the object in main memory (step 318). Next, the system proceeds to step 312 to access the object in order to satisfy the request.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing objects stored outside of main memory in an object-addressed memory hierarchy, comprising:

receiving a request to access an object, wherein the request includes an object identifier for the object that is used to reference the object within the object-addressed memory hierarchy, wherein the request to access the object is received at a hardware translator within a central processing unit (CPU) and wherein the translator translates between object identifiers (used to reference objects in an object cache within the CPU) and physical addresses (used to address objects in main memory);

using the object identifier to retrieve an object table entry associated with the object, wherein the object table entry associates a given object identifier with a corresponding physical address if the object is in main memory and an external location if the object is not in main memory;

examining a valid indicator within the object table entry;

if the valid indicator indicates the object is located in main memory, using a physical address in the object table entry to access the object in main memory; and if the valid indicator indicates that the object is not located in main memory, relocating the object into memory from a location outside of memory, and then accessing the object in main memory.

2. The method of claim 1, wherein prior to receiving the request at the translator, the request is initially directed to the object cache;

wherein if the request causes a hit in the object cache, the object is accessed in the object cache and the request is not sent to the translator; and wherein if the request causes a miss in the object cache, the request is sent to the translator.

3. The method of claim 1, wherein relocating the object into main memory involves using location information from the object table entry to determine the location of the object outside of main memory.

4. The method of claim 3, wherein the location information can include:

a secondary storage address for the object;

a network address for the object;

a uniform (or universal) resource locator (URL) for the object;

another (possibly different) object identifier associated with the object; and a physical address for a compressed block of objects containing the object.

5. The method of claim 3, wherein the location information is overloaded into a physical address field in the object table entry.

6. The method of claim 1, wherein relocating the object into main memory involves causing an object fault handler to execute in a central processing unit (CPU) to relocate the object into main memory.

7. The method of claim 1, wherein relocating the object into main memory involves overlapping retrieval of multiple objects into main memory from locations outside of main memory.

8. The method of claim 1, wherein after relocating the object into main memory, the method further comprises:
   updating the valid indicator to specify that the object is located in main memory; and
   updating the physical address in the object table entry to specify the location of the object in main memory.

9. The method of claim 1, wherein the object is defined within an object-oriented programming system.

10. An apparatus that facilitates accessing objects stored outside of main memory in an object-addressed memory hierarchy, comprising:
   a receiving mechanism configured to receive a request to access an object, wherein the request includes an object identifier for the object that is used to reference the object within the object-addressed memory hierarchy wherein the request to access the object is received at a hardware translator within a central processing unit (CPU) and wherein the translator translates between object identifiers (used to reference objects in an object cache within the CPU) and physical addresses (used to address objects in main memory);
   a object table lookup mechanism configured to use the object identifier to retrieve an object table entry associated with the object, wherein the object table entry associates a given object identifier with a corresponding physical address if the object is in main memory and an external location if the object is not in main memory;
   an access mechanism configured to,
      examine a valid indicator within the object table entry,
      if the valid indicator indicates the object is located in main memory, to use a physical address in the object table entry to access the object in main memory, and
      if the valid indicator indicates that the object is not located in main memory, to relocate the object into memory from a location outside of memory, and to access the object in main memory.

11. The apparatus of claim 10, further comprising the object cache,
   wherein prior to receiving the request at the translator, the request is initially directed to the object cache;
   wherein if the request causes a hit in the object cache, the object is accessed in the object cache and the request is not sent to the translator; and
   wherein if the request causes a miss in the object cache, the request is sent to the translator.

12. The apparatus of claim 10, wherein while relocating the object into main memory, the access mechanism is configured to use location information from the object table entry to determine the location of the object outside of main memory.

13. The apparatus of claim 12, wherein the location information can include:
   a secondary storage address for the object;
   a network address for the object;
   a uniform (or universal) resource locator (URL) for the object;
   another (possibly different) object identifier associated with the object; and
   a physical address for a compressed block of objects containing the object.

14. The apparatus of claim 12, wherein the location information is overloaded into a physical address field in the object table entry.

15. The apparatus of claim 10, wherein while relocating the object into main memory, the access mechanism is configured to cause an object fault handler to execute in a central processing unit (CPU) to relocate the object into main memory.

16. The apparatus of claim 10, wherein while relocating the object into main memory the access mechanism is configured to overlap retrieval of multiple objects into main memory from locations outside of main memory.

17. The apparatus of claim 10, wherein after relocating the object into main memory, the access mechanism is configured to:
   update the valid indicator to specify that the object is located in main memory; and to
   update the physical address in the object table entry to specify the location of the object in main memory.

18. The apparatus of claim 10, wherein the object is defined within an object-oriented programming system.

19. A computer system that facilitates accessing objects stored outside of main memory in an object-addressed memory hierarchy, comprising: a processor; a main memory; the object-addressed memory hierarchy; an object cache within the object-addressed memory hierarchy; a hardware translator that translates between object identifiers, used to address objects in the object cache of a central processing unit (CPU), and physical addresses, used to address objects in main memory; wherein the hardware translator is configured to receive a request to access an object after the request misses in the object cache of the CPU, wherein the request includes an object identifier for the object that is used to reference the object within the object-addressed memory hierarchy, and wherein the object table entry associates a given object identifier with a corresponding physical address if the object is in main memory and an external location if the object is not in main memory; a object table lookup mechanism with the hardware translator configured to use the object identifier to retrieve an object table entry associated with the object; and an access mechanism configured to, examine a valid indicator within the object table entry, if the valid indicator indicates the object is located in main memory, to use a physical address in the object table entry to access the object in main memory, and if the valid indicator indicates that the object is not located in main memory, to relocate the object into memory from a location outside of memory, and to access the object in main memory.

* * * * *